US009869984B2

(12) United States Patent
Tsuchiya et al.

(10) Patent No.: US 9,869,984 B2
(45) Date of Patent: Jan. 16, 2018

(54) PROCESS CONTROLLER AND UPDATING METHOD THEREOF

(71) Applicant: YOKOGAWA ELECTRIC CORPORATION, Musashino-shi, Tokyo (JP)

(72) Inventors: Masanobu Tsuchiya, Tokyo (JP); Takeshi Ohno, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 553 days.

(21) Appl. No.: 14/599,101

(22) Filed: Jan. 16, 2015

(65) Prior Publication Data
US 2015/0205280 A1 Jul. 23, 2015

(30) Foreign Application Priority Data

Jan. 20, 2014 (JP) .................................. 2014-008047

(51) Int. Cl.
G06F 9/455 (2006.01)
G05B 19/042 (2006.01)

(52) U.S. Cl.
CPC ..... *G05B 19/0421* (2013.01); *G05B 19/0426* (2013.01); *G06F 9/45558* (2013.01);
(Continued)

(58) Field of Classification Search
None
See application file for complete search history.

(56) References Cited

U.S. PATENT DOCUMENTS 8,069,218 B1* 11/2011 Tormasov ............. G06F 9/4856
709/212
2006/0117212 A1* 6/2006 Meyer ................... G06F 3/0605
714/4.11
(Continued)

FOREIGN PATENT DOCUMENTS

EP 2642360 A1 9/2013
JP 2001-350514 A 12/2001
(Continued)

OTHER PUBLICATIONS

Bertossi A A et al: "Increasing Processor Utilization in Hard-Real-Time Systems With Checkpoints", Real Time Systems, Kluwer Academic Publishers, Dordrecht, NL, vol. 9, No. 1, Jul. 1, 1995, pp. 5-29, XP000521867, ISSN: 0922-6443, DOI: 10.1007/BF01094171 * abstract * * figure 2 * * sections 1-4 *.
(Continued)

*Primary Examiner* — Isaac T Tecklu
(74) *Attorney, Agent, or Firm* — Sughrue Mion, PLLC

(57) ABSTRACT

A process controller includes a first virtualizer to run in a first process controller and a first operating system to run on the first virtualizer, the first operating system transiting from a first state to a second state when control of an industrial process is started. The first operating system transits from the second state to the first state when control of the industrial process for one period ends, the first state being waiting for starting the control of the industrial process, and the second state being when the industrial process is performed. An application runs on the first operating system and performs control of the industrial process at a constant period. A saving unit saves information representing an inner state of the application when the first operating system is in the first state, the information restoring the application
(Continued)

in a second process controller different from the first process controller.

19 Claims, 7 Drawing Sheets

(52) U.S. Cl.
CPC ............... *G05B 2219/2212* (2013.01); *G05B 2219/23327* (2013.01); *G06F 2009/4557* (2013.01)

(56) References Cited

U.S. PATENT DOCUMENTS

| | | | | |
|---|---|---|---|---|
| 2008/0189468 | A1* | 8/2008 | Schmidt | G06F 11/203 711/6 |
| 2010/0173699 | A1* | 7/2010 | Gagner | G07F 17/32 463/29 |
| 2011/0145380 | A1* | 6/2011 | Glikson | G06F 9/4856 709/223 |
| 2011/0169522 | A1* | 7/2011 | Raj | H03K 19/177 326/10 |
| 2012/0005676 | A1* | 1/2012 | Nakajima | G06F 8/65 718/1 |
| 2012/0278802 | A1* | 11/2012 | Nilakantan | G06F 9/45558 718/1 |
| 2012/0331180 | A1* | 12/2012 | Bonaci | G06F 9/06 709/250 |
| 2013/0179872 | A1* | 7/2013 | Kuzmack | G06F 8/665 717/173 |
| 2013/0185716 | A1* | 7/2013 | Yin | G06F 9/45558 718/1 |
| 2013/0253671 | A1* | 9/2013 | Torigoe | G05B 19/0421 700/82 |
| 2016/0197809 | A1* | 7/2016 | Young | H04L 41/5016 709/224 |
| 2017/0005870 | A1* | 1/2017 | Narain | H04L 41/0823 |

FOREIGN PATENT DOCUMENTS

| | | |
|---|---|---|
| JP | 2002-149212 A | 5/2002 |
| JP | 4399773 B2 | 1/2010 |
| JP | 2013-200669 A | 10/2013 |
| WO | 2012/047654 A1 | 4/2012 |

OTHER PUBLICATIONS

Yu Sun, "Virtual Machine Xen and Research on Live Migration Technology Thereof", Chinese Master's Dissertations Full-Text Database, Information Technology, p. 9-12, Jul. 2008 (6 pgs. total).

* cited by examiner

FIG. 7

| ENTRY No. | FIRST DESCRIPTOR | SECOND DESCRIPTOR |
|---|---|---|
| #1 | 1 | 9 |
| #2 | 2 | 13 |
| #3 | 3 | 21 |
| ⋮ | ⋮ | ⋮ |

PROCESS CONTROLLER AND UPDATING METHOD THEREOF

BACKGROUND OF THE INVENTION

Field of the Invention

The disclosure relates to a process controller and an updating method thereof.

Priority is claimed on Japanese Patent Application No. 2014-008047, filed Jan. 20, 2014, the contents of which are incorporated herein by reference.

Description of Related Art

A process control system controlling various types of state quantity (for example, pressure, temperature, and flow quantity of fluid) is installed in a plant and a factory (hereinafter called simply "plant" as a generic name of them). Specifically, Japanese Patent No. 4399773 discloses that a controller (process controller) which is a core of the process control system collects detection results of sensors (for example, a flowmeter and a thermometer), the controller calculates a manipulation value of an actuator (for example, a valve) in accordance with the detection results, and the controller manipulates the actuator in accordance with the calculated manipulation value. By these processes, the various types of the state quantity described above are controlled.

Although the process control system is established by using a dedicated device for exclusive use, a recent process control system is being opened and often established by using a general-use device (a computer or a workstation) of which specifications are opened. In the process control system using the general-use device, same as a general information system, there is a need to switch over (update) a platform includes hardware, an operating system (OS), and so on. The platform is switched over so as to, for example, expand a function of the platform or correct a failure and weakness of the platform.

Although the process control system is often established singly, the recent process control system is often connected to another information system performing a production management or the like so as to improve productivity of the plant. In a case that the process control system is connected to another information system, there is a risk of external cyber-attacks. For the reason, it is important to switch over the platform continuously.

The process controller switches over the platform so as to shorten the downtime of a control performed by the control application as much as possible. Specifically, the platform of the process controller is switched over by the following procedures 1 to 4. "Old process controller" means a process controller used before the platform is switched over. "New process controller" means a process controller to be used after the platform is switched over.

1. Starting the new process controller so as to make the control application be settable.

2. Transferring a setting of the control application which had run in the old process controller to the new process controller.

3. Causing the old process controller to stop. (By this task, the network is disconnected, and the control application comes to a stop.)

4. Booting a control application in the new process controller.

In the procedures described above, the old process controller is caused to stop (procedure 3) before booting the control application in the new process controller (procedure 4). By these procedures, a competition of a plurality of same control applications is preventable. However, in a case of switching over the platform by the procedures 1 to 4, the control application is caused to stop running when the old process controller is caused to stop, the operation states of the old process controller (an operation state of the control application, an operation state of the operating system, a communication state, and so on) is not taken over by the new process controller.

In a case that the control application is booted in the new process controller without taking over the operation state, the control application must start an initializing task. For the reason, there is a possibility that the control operation is to be discontinuous. "The control operation is to be discontinuous" means, for example, that an operation to be performed intrinsically is not performed or that same operations are performed redundantly. In a case that the control operation is discontinuous, work-in-process is seriously damaged in accordance with characteristics thereof, and also there is a possibility that a facility which is a control object is damaged.

SUMMARY

A process controller may include a first virtualizer configured to run in the first process controller, a first operating system configured to run on the first virtualizer, the first operating system transiting from a first state to a second state in a case that a control of an industrial process implemented in a plant is started, the first operating system transiting from the second state to the first state in a case that the control of the industrial process for one period ends, the first state being a state waiting for starting the control of the industrial process, and the second state being a state in which the control of the industrial process is performed, an application configured to run on the first operating system, the application performing the control of the industrial process at a constant period, and a saving unit configured to save information representing an inner state of the application in a case that the first operating system is in the first state, the information being necessary for restoring the application in a second process controller different from the first process controller.

BRIEF DESCRIPTION OF THE DRAWINGS

FIG. 7 is a drawing illustrating an example of the contents of the database in the second embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Object of some embodiments of the present invention is to provide a process controller and an updating method thereof, which can switch over the platform while continuing running the control application by taking over the operation states.

First Embodiment

[Process Control System]

Figure 1:
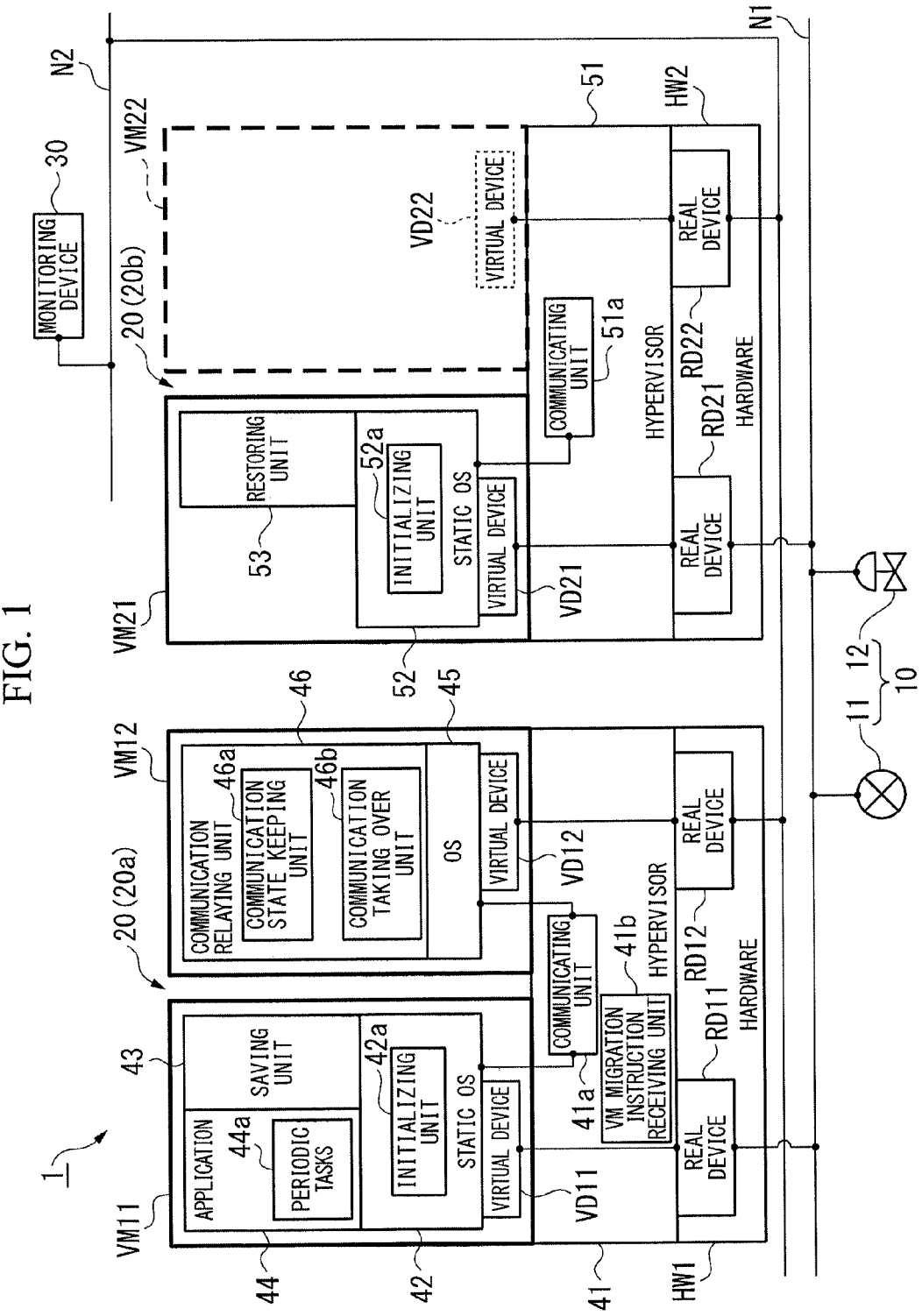
FIG. 1 is a block diagram illustrating a main part of a process control system using a process controller in a first embodiment.

FIG. 1 is a block diagram illustrating a main part of a process control system using a process controller in a first embodiment. As shown in FIG. 1, the process control system 1 includes a plurality of field devices 10, controllers 20 (process controller), and a monitoring device 30 (host device). The controllers 20 control the field devices 10 under a monitoring of the monitoring device 30 so as to control an industrial process implemented in the plant (not shown).

A controller 20a of the two controllers 20 shown in FIG. 1 is a controller used in order to control the industrial process. Another controller 20b of the two controllers 20 shown in FIG. 1 is a controller newly used in place of the controller 20a. In other words, the controller 20b is a controller newly used in accordance with the switching over of the platform in the controller 20a.

The field devices 10 and controllers 20 (20a, 20b) are connected to a field network N1. The controllers 20 (20a, 20b) and the monitoring device 30 are connected to the control network N2. For example, the field network N1 is a wired network laid in a field of the plant, in which the process controller and the field devices communicates with each other by a stateless communication path. On the other hand, for example, the control network N2 is a wired network laid between the field of the plant and a monitoring room, in which the process controllers communicate with each other or the process controller and the monitoring device communicate with each other by a stateless communication path or a stateful communication path. The field network N1 and the control network N2 may be a wireless network.

"Stateless communication path" means a communication path in which communication start/end procedures are not performed and communication state control and management (for example, transmitting management) are not performed. In other words, "stateless communication path" means a communication path in which communication can be performed by another means without managing the communication state. On the other hand, "stateful communication path" means a communication path in which the communication start/end procedures are performed and the communication state control and management (for example, the transmitting management) are performed. In a case that a coherent communication is lost and cannot be recovered in the stateful communication path, the communication path is terminated at any of ends.

The field devices 10 are, for example, such as a sensor device (for example, a flowmeter and a temperature sensor), a valve device (for example, a flow control valve and an on-off valve), an actuator device (for example, a fan and a motor), and other devices installed in the field of the plant. To understand easily, as the field devices 10 installed in the plant, a sensor device 11 measuring flow quantity of fluid and a valve device 12 controlling (manipulating) the flow quantity of fluid are shown in FIG. 1.

The field devices 10 operate in accordance with control data transmitted from the controller 20 via the field network N1. For example, in a case that a request to transmit the measurement data (data indicating a measurement result of the flow quantity of fluid) is transmitted from the controller 20 to the sensor device 11, the sensor device 11 transmits the measurement data to the controller 20 via the field network N1. In a case that the control data (data for controlling an aperture of the valve) is transmitted from the controller 20 to the valve device 12, the valve device 12 controls the aperture of the valve through which fluid flows based on the control data.

The controller 20 performs a periodic task about the industrial process control under monitoring of the monitoring device 30. "Periodic task" means a task performed at a constant period by the controller 20. For example, "periodic task" means a series of tasks of collecting a process value PV from the sensor device 11, receiving a setting value SV from the monitoring device 30, calculating a manipulation value MV, and transferring the manipulation value MV to the valve device 12. The function of the controller 20 is implemented by reading software into a computer and cooperation between the software and the hardware. Specific function implemented by the controllers 20 (20a, 20b) will be described later.

For example, the monitoring device 30 is implemented by a computer. A plant operator manipulates the monitoring device 30 so as to monitor the industrial process. Specifically, the monitoring device 30 monitors a control function of an application running in the controller 20 (detail will be described later). The plant operator instructs and manipulates the controller 20 in accordance with the monitoring result. The monitoring device 30 establishes a stateful communication path with the controller 20.

[Controller 20a]

The controller 20a includes a hardware HW1 including an MPU (Micro-Processing Unit), memory, and so on. The hardware HW1 executes installed programs so as to implement the function of the controller 20a. Real devices RD11 and RD12 are communication devices such as an NIC (Network Interface Card), I/O (Input/Output) module, and so on. The real device RD11 is connected to the field network N1, and the real device RD12 is connected to the control network N2.

A program for implementing a hypervisor 41 (virtualizer), a static operating system (OS) 42 (first operating system), a program for implementing a saving unit 43, and an operating system 45 (second operating system) are installed in the controller 20a. Functions implemented by these programs are functions fixedly-embedded in the controller 20a. Also, a program for implementing an application 44 and a program for implementing a communication relaying unit 46 are installed in the controller 20a. Functions implemented by these programs are to be moved to a controller 20b by switching over the platform of the controller 20a.

The hypervisor 41 enables the static operating system 42, the saving unit 43, and the application 44 to run independently of the operating system 45 and the communication relaying unit 46. The hypervisor 41 also enables the operating system 45 and the communication relaying unit 46 to run independently of the static operating system 42, the saving unit 43, and the application 44. The hypervisor 41 allocates hardware resources and relates the real devices RD11 and RD12 to virtual devices VD11 and VD12 respectively. The hypervisor 41 runs virtual machines VM11 and VM12 (virtualizer) in a parallel way.

The virtual machine VM11 is a virtual hardware in which the static operating system 42, the program for implementing saving unit 43, and the program for implementing an application 44 run. The virtual machine VM11 includes the virtual device VD11 relating to the real device RD11. The virtual machine VM12 is a virtual hardware in which the operating system 45 and the communication relaying unit 46 run. The virtual machine VM12 includes the virtual device VD12 relating to the real device RD12. That is, the hypervisor 41 manages the virtual machines VM11 and VM12 running virtually instead of the hardware HW1.

As shown in FIG. 1, the hypervisor 41 includes a communicating unit 41*a* and VM migration instruction receiving unit 41*b*. The communicating unit 41*a* implements communications between the virtual machine VM11 and the virtual machine VM12. Because the communicating unit 41*a* is a virtual communication path in the hypervisor 41, a communication method which does not depend on a compatibility with an external communication can be performed. For example, the virtual machine VM11 and the virtual machine VM12 are connected one-to-one. Instead of this, communication contents may be copied in a shared memory so as to reduce communication overhead and simplify an implementation.

The VM migration instruction receiving unit 41*b* receives an instruction (live migration instruction) so as to migrate an assigned virtual machine to another hypervisor. "Live migration" means a technology of migrating a place where the virtual machine runs. The live migration is performed by suspending the operation of the virtual machine, copying whole internal states of the virtual machine including a communication state, restarting the operation of the virtual machine in a destination virtual machine by using the copied internal states. It appears from the outside that the place where the virtual machine runs is migrated to another place without stopping and initializing. In the present embodiment, the live migration instruction is performed by the saving unit 43.

The static operating system 42 runs in the virtual machine VM11. The static operating system 42 provides a running environment of the saving unit 43 and the application 44. The static operating system 42 manages OS resource objects. The static operating system 42 is an operating system preliminarily allocating the OS resource objects necessary for running the saving unit 43 and the application 44. The preliminarily allocated OS resource objects include a shared memory, a task, semaphore, and a network connection, and so on. The allocation of the OS resource objects is performed by using a configurator (a tool for allocating the OS resource objects) before the static operating system 42 runs.

The static operating system 42 includes an initializing unit 42*a* initializing the static operating system 42. The initializing unit 42*a* initializes the static operating system 42 by executing tasks described below before the saving unit 43 and the application 44 run.

(a) Initializing the OS resource objects.

(b) Establishing the stateful communication path of the application 44.

Figure 2:
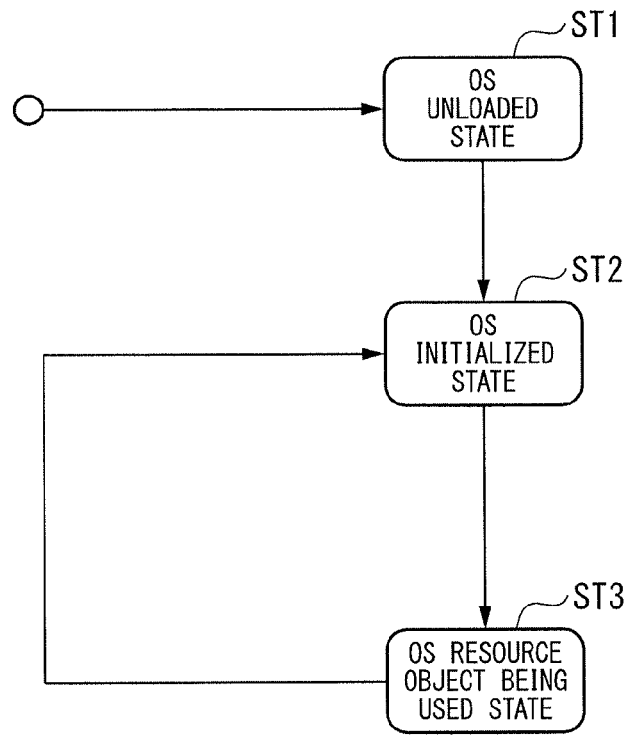
FIG. 2 is a state transition diagram of the static operating system in the first embodiment.

The state of the static operating system 42 transits in accordance with an operation status of the controller 20*a*. FIG. 2 is a state transition diagram of the static operating system in the first embodiment. As shown in FIG. 2, the state of the static operating system 42 includes an OS unloaded state ST1, an OS initialized state ST2 (first state), and the OS resource object being used state ST3 (second state).

The OS unloaded state ST1 is a state immediately before the controller 20*a* is powered on, the hypervisor 41 and the virtual machine VM11 and VM12 are booted, and the static operating system 42 is loaded. The OS initialized state ST2 is a state in which the static operating system 42 is initialized and the application 44 can be started. After the static operating system 42 is loaded, when the static operating system 42 transits to the OS initialized state ST2 for the first time, the static operating system 42 runs the initializing unit 42*a* initializing the OS resource objects allocated by using a configurator, and establishes the stateful communication path.

The OS resource object being used state ST3 is a state in which the application 44 is executed and periodic tasks 44*a* included in the application 44 is in an executing state. The periodic tasks 44*a* are implemented as a software program. Specific examples of the periodic tasks will be described later. In the state ST3, because the periodic tasks 44*a* start to use the OS resource objects in accordance with program of a periodic task, the static operating system 42 is in a transitional state in which an inner state of the static operating system 42 changes in accordance with contents of the periodic tasks. As shown in FIG. 2, when the periodic tasks 44*a* end the periodic task for one period, the use of the OS resource objects ends and the static operating system 42 returns to the state immediately after the initializing task is performed. For the reason, the static operating system 42 transits to the OS initialized state ST2 which is a starting point of the periodic task. When the periodic tasks 44*a* start the periodic task for one period again, the static operating system 42 transits to the OS resource object being used state ST3.

The saving unit 43 saves information (snapshot) necessary for transferring the application 44 running in the controller 20*a* to the controller 20*b*, and the saving unit 43 transmits the saved snapshot to the controller 20*b*. The snapshot is a context representing an inner state of the running application 44 which is saved so as to keep the state of the application 44. By using the snapshot, an operation of the application 44 from when the snapshot is saved can be restored and the operation can be continued. For example, "a context representing an inner state when the snapshot is saved" is content in a memory area of the application 44. The snapshot includes an identifier of the communication path established by the application 44 so as to communicate with reference to a communication state.

Figure 3:
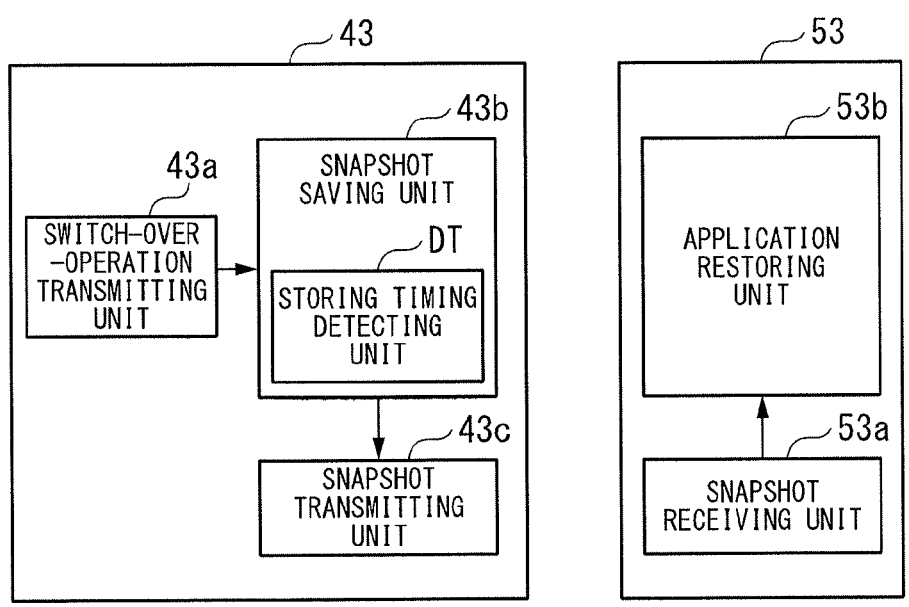
FIG. 3 is a block diagram illustrating tasks of saving and restoring the snapshot in the first embodiment.

FIG. 3 is a block diagram illustrating tasks of saving and restoring the snapshot in the first embodiment. As shown in FIG. 3, the saving unit 43 includes a switch-over-operation transmitting unit 43*a*, a snapshot saving unit 43*b*, and a snapshot transmitting unit 43*c*. The switch-over-operation transmitting unit 43*a* receives a switching over instruction (instruction for switching over from the controller 20*a* to the controller 20*b*) transmitted from an instruction apparatus (not shown) disposed outside of the controller 20*a*. After that, the switch-over-operation transmitting unit 43*a* transmits the received switching over instruction to the snapshot saving unit 43*b*.

The snapshot saving unit 43*b* creates and saves the snapshot in accordance with the switching over instruction transmitted from the switch-over-operation transmitting unit 43*a* at a timing detected by a saving timing detecting unit DT so that the controller 20*b* can take over the operation state of the application 44. The saving timing detecting unit DT monitors the operation of the application 44 and detects the timing when the snapshot saving unit 43b starts to run. In other words, the timing is when the periodic tasks 44a included in the application 44 end the periodic task for one period.

The snapshot transmitting unit 43c transmits the snapshot saved by the snapshot saving unit 43b to the restoring unit 53 of the controller 20b. The snapshot transmitting unit 43c is not necessarily disposed in the saving unit 43 if the snapshot can be transmitted to the restoring unit 53 of the controller 20b. For example, the snapshot transmitting unit 43c may be disposed in the static operating system 42 or the communicating unit 41a.

The application 44 runs in the static operating system 42, and the application 44 performs a control of the field devices 10 necessary for performing a process control. Specifically, the application 44 includes the periodic tasks 44a, and the application 44 performs the periodic task relating to the industrial process control described above. For example, the application 44 performs a task of collecting measurement data from the sensor device 11 at a constant period, a task of calculating control data for controlling the valve device 12 at a constant period, a task of transmitting the control data to the valve device 12 at a constant period, or the like.

The operating system 45 runs in the virtual machine VM12, and the operating system 45 provides a running environment of the communication relaying unit 46. There is a need that the operating system can establish a dynamic communication path so as to perform a task of taking over the communication which will be described later. Other than the static operating system 42, for example, a general operating system used by a personal computer and a workstation has the function.

The communication relaying unit 46 runs on the operating system 45. The communication relaying unit 46 takes over the communication by re-establishing the communication path between the application 44 and the communication relaying unit 46 as necessary while keeping the communication state of the stateful communication path between the communication relaying unit 46 and the monitoring device 30. The communication relaying unit 46 relays the communication between the application 44 and the monitoring device 30. By these tasks, the communication relaying unit 46 can perform a continuation of the communication between the application 44 and the monitoring device 30.

"A continuation of the communication" means that both ends of the communication path can continue the communication by "keeping the communication state" and "taking over the communication". "Keeping the communication state" means that if one end (the communication relaying unit 46) of the communication path changes position, another end (the monitoring device 30) keeps the communication between the both ends without detecting the position change. "Taking over the communication" means that when the communication destination (the communication relaying unit 46) changes position, the communication path is re-created (re-established) and new communication state is created.

As shown in FIG. 1, the communication relaying unit 46 includes a communication state keeping unit 46a and a communication taking over unit 46b. The communication state keeping unit 46a establishes the stateful communication path with the monitoring device 30 connected to the control network N2 instead of the application 44, and the communication state keeping unit 46a performs the communication. The communication state keeping unit 46a keeps the established stateful communication path so as not to terminate the communication path. The communication taking over unit 46b establishes the communication path with the application 44 instead of the monitoring device 30, and the communication taking over unit 46b performs the communication. In a case that the platform is switched over and the established communication path is terminated, the communication taking over unit 46b performs a task for re-establishing the communication path.

For example, the function of keeping the communication state of the communication state keeping unit 46a and the function of taking over the communication path of the communication taking over unit 46b can be implemented by using a reverse proxy. The reverse proxy is different from a normal proxy (a proxy for collecting requests transmitted from clients inside of the proxy and communicating with an outer server by proxy). The reverse proxy is a proxy for collecting requests transmitted from clients outside of the proxy and communicating with an inner server by proxy. For example, in a case that the communication relaying unit 46 is implemented by a reverse proxy of HTTP (HyperText Transfer Protocol), the state of the stateful communication path between the application 44 and the monitoring device 30 can be kept by storing a sequence number of TCP (Transmission Control Protocol), IP address allocated to the communication path by each of the communication relaying unit 46 and the monitoring device 30, a port number, and so on.

[Controller 20b]

Same as the controller 20a, the controller 20b includes a hardware HW2 including an MPU, memory, and so on. The hardware HW2 executes an installed program so as to implement the function of the controller 20b. Real devices RD21 and RD22 are communication devices such as an NIC, I/O module, and so on. The real device RD21 is connected to the field network N1, and the real device RD22 is connected to the control network N2.

A program for implementing a hypervisor 51 (virtualizer), a static operating system 52 (third operating system), and a program for implementing the restoring unit 53 are installed in the controller 20b. Functions implemented by these programs are functions fixedly-embedded in the controller 20a. The hypervisor 51 runs virtual machines VM21 and VM22 (virtualizer) in a parallel way.

The hypervisor 51 performs the live migration in cooperation with the hypervisor 41 of the controller 20a, and the virtual machine VM12 running in the controller 20a is migrated as the virtual machine VM22. In other words, the operating system 45 and the communication relaying unit 46 of the controller 20a are migrated while the communication between the application 44 and the monitoring device 30 is taken over.

The virtual machine VM21 is a virtual hardware in which the static operating system 52 and the restoring unit 53 run. The virtual machine VM21 includes the virtual device VD21 relating to the real device RD21. The virtual machine VM22 is a virtual hardware in which the operating system 45 migrated from the controller 20a by the live migration and the communication relaying unit 46 run. The virtual machine VM22 includes the virtual device VD22 relating to the real device RD22.

As shown in FIG. 1, the hypervisor 51 includes a communicating unit 51a. The communicating unit 51a is substantially same as the communicating unit 41a included in the hypervisor 41 of the controller 20a. The communicating unit 51a implements communications between the virtual machine VM21 and the virtual machine VM22. In the first embodiment, a live migration of the virtual machine VM22 is not performed in the controller 20a. For the reason, the hypervisor 51 does not include a unit corresponding to the VM migration instruction receiving unit 41b included in the hypervisor 41 of the controller 20a.

The static operating system 52 runs in the virtual machine VM21. The static operating system 52 provides a running environment of the restoring unit 53 and the restored application 44. The static operating system 52 manages the OS resource objects. Same as the static operating system 42 of the controller 20a, the static operating system 52 includes an initializing unit 52a, and a state of the static operating system 52 transits as shown in FIG. 2.

The application 44 runs in the controller 20a, and the restoring unit 53 restores the application 44 in the controller 20b. Specifically, the restoring unit 53 restores the application 44 on the static operating system 52 of the controller 20b by using the snapshot obtained from the saving unit 43 of the controller 20a. As shown in FIG. 3, the restoring unit 53 includes a snapshot receiving unit 53a and an application restoring unit 53b.

The snapshot receiving unit 53a receives the snapshot transmitted from the snapshot transmitting unit 43c of the saving unit 43. Same as the snapshot transmitting unit 43c, the snapshot receiving unit 53a is not necessarily included in the restoring unit 53 if the snapshot can be received from the saving unit 43. The application restoring unit 53b restores the application 44 on the static operating system 52 by using the snapshot received by the snapshot receiving unit 53a.

[Switching Over Method of the Controller]

Next, a switching over method (updating method) of the controller 20 will be described. An example of a method of switching over the controller 20a executing the periodic task for controlling the industrial process to the controller 20b is as follows. The OS resource objects described below are preliminarily allocated to the static operating system 42 of the controller 20a by using the configurator.

(a) Number of tasks and dependence relationship for implementing the saving unit 43 and application 44.

(b) Allocation amounts of such as memory area used by each of the tasks.

(c) Type and number of resources which are used and shared by the each of the tasks.

Examples of the type of the resources: a lock and a semaphore for implementing an exclusive task, a mailbox for implementing an inter-task communication, a shared memory, and so on.

(d) Number of network communication resources established by the static operating system 42, and a network communication setting.

The network communication setting is set to the OS resource objects of the network communication so that the static operating system 42 can accept the network communication. For example, in a case that TCP or UDP (User Datagram Protocol) is used as a communication protocol of a transport layer, there are settings described below.

(e) An identifier of the communication path (socket descriptor).

(f) A method of establishing the communication path.

Examples of the method: connect (actively connect) and listen (passively wait for the connection).

(g) A port number used for accepting a communication and communicating.

(h) A protocol of the transport layer used for communicating.

Examples of the protocol: TCP and UDP.

The stateful communication path via the communication relaying unit 46 is established between the application 44 of the controller 20a and the monitoring device 30.

In a case of switching over the controller 20a to the controller 20b, first, a setting operation for the new controller 20b is performed. Specifically, the controller 20b performs a setting operation for running the virtual machine VM 21 and VM22 and a setting operation of the OS initialized state ST2 of the static operating system 52.

In the former setting operation, for example, the hardware resources are allocated, and the real devices RD21 and RD22 are related to the virtual devices VD21 and VD22 respectively. In the latter setting operation, for example, the OS resource object is allocated by using the configurator so as to set the OS initialized state ST2. Specifically, in the latter setting operation, the OS resource objects including the OS resource objects allocated to the static operating system 42 is allocated to the static operating system 52 of the controller 20b.

Next, the controller 20b to which the setting operations described above has been performed is installed in the field, and the controller 20b is connected to the field network N1 and the control network N2. After that, when the controller 20b is powered on, an initializing task of the controller 20b is performed. In the initializing task, first, the hypervisor 51 is booted. The booted hypervisor 51 runs the virtual machine VM 21, and the static operating system 52 is loaded. Next, the static operating system 52 initializes the OS resource objects and sets the network in accordance with the contents of the setting operation described above.

Next, an initializing task performed by the initializing unit 52a waits for the establishment of the stateful communication path. After completion of these tasks described above, the initializing unit 52a boots the restoring unit 53. When the restoring unit 53 is booted, the snapshot receiving unit 53a (refer to FIG. 3) waits for the snapshot to be received, and the hypervisor 51 waits for the live migration to be performed.

After that, when the switching over instruction (instruction for switching over the controller 20a to the controller 20b) is transmitted from an instruction apparatus (not shown), a switching over task of the controller 20 is performed. For example, the instruction apparatus is an engineering-workstation which is connected to the control network N2, and the instruction apparatus can instructs the controller 20 by using a communication unrelated to a continuation of the control operation. In a case that the monitoring device 30 can perform the communication unrelated to the continuation of the control operation, the monitoring device 30 may have the function of the instruction apparatus.

Figure 4:
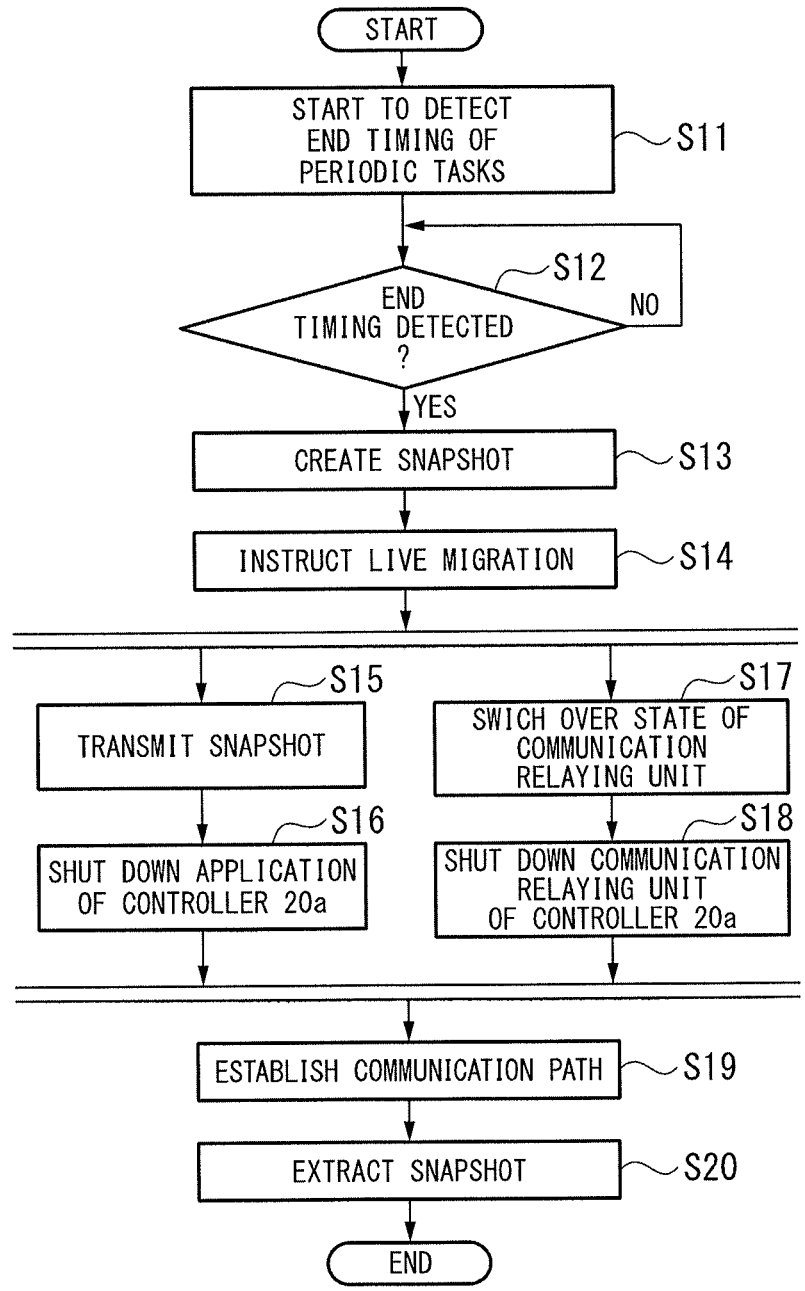
FIG. 4 is a flowchart illustrating a switching over method of the controller in the first embodiment.

FIG. 4 is a flowchart illustrating a switching over method of the controller in the first embodiment. When the switch-over-operation transmitting unit 43a (refer to FIG. 3) included in the saving unit 43 receives the switching over instruction transmitted from the instruction apparatus (not shown), the flowchart shown in FIG. 4 is started.

When the flowchart shown in FIG. 4 is started, first, the switch-over-operation transmitting unit 43a transmits the switching over instruction to the snapshot saving unit 43b. After the transmitting, the saving timing detecting unit DT starts to detect an end timing of the periodic task for one period performed by the periodic tasks 44a included in the application 44 (step S11). Next, the snapshot saving unit 43b determines whether the saving timing detecting unit DT detects the end timing of the periodic task for one period or not (in other words, whether the static operating system 42 transits from the OS resource object being used state ST3 to the OS initialized state ST2 or not) (step S12).

In a case that the snapshot saving unit 43b determines that the saving timing detecting unit DT does not detect the end timing of the periodic task for one period (NO at step S12), step S12 is repeated. On the other hand, in a case that the snapshot saving unit 43b determines that the saving timing detecting unit DT detects the end timing of the periodic task for one period (YES at step S12), the snapshot saving unit 43b creates and saves information (snapshot) necessary for restoring the application 44 running in the controller 20a (step S13: first step). Next, the saving unit 43 transmits an instruction for performing the live migration of the virtual machine VM12 in which the communication relaying unit 46 runs to the VM migration instruction receiving unit 41b (step S14).

Next, the snapshot transmitting unit 43c transmits the snapshot saved by the snapshot saving unit 43b (step S15). Specifically, in the controller 20a, the snapshot transmitting unit 43c reads the snapshot saved by the snapshot saving unit 43b, and the snapshot transmitting unit 43c transmits the snapshot to the restoring unit 53 of the controller 20b. In the controller 20b, the snapshot receiving unit 53a of the restoring unit 53 receives the snapshot transmitted from the snapshot transmitting unit 43c, and the snapshot receiving unit 53a transmits the snapshot to the application restoring unit 53b. After completion of transmitting the snapshot, the controller 20a shuts down the application 44 (step S16).

In parallel with the task described above, the hypervisor 41 of the controller 20a, to which the live migration is instructed, performs the live migration to the hypervisor 51 of the controller 20b. Specifically, the hypervisor 41 and 51 perform the live migration so that the virtual machine VM12 running in the controller 20a can run continuously as the virtual machine VM 22 running in the controller 20b. By performing the live migration, the communication relaying unit 46 running in the controller 20a is migrated to the controller 20b (step S17: third step).

Because the communication relaying unit 46 which had run in the controller 20a is migrated to the controller 20b while the communication state is kept, the stateful communication path established between the communication state keeping unit 46a and the monitoring device 30 is not terminated. After completion of the live migration, the controller 20a shuts down the communication relaying unit 46 (step S18).

After that, the communication relaying unit 46 migrated to the controller 20b performs a task of re-establishing the stateful communication between the application 44 restored in the controller 20b and the monitoring device 30 (step S19). Specifically, the communication taking over unit 46b migrated to the controller 20b performs a task of re-establishing the communication path between the application 44 restored in the controller 20b and the monitoring device 30. More specifically, the communication taking over unit 46b connects to the port of the static operating system 52 waiting for the establishment of the communication path in accordance with a predetermined network setting. The port number of the port connected by the communication taking over unit 46b is same as the number of the port of the communication path which has been already established and connected to the monitoring device 30. After the connection, the initializing unit 52a of the static operating system 52 accepts the connection from the communication taking over unit 46b, and the initializing unit 52a establishes the communication path connected to the application 44 restored in the controller 20b. Because an identifier of the established communication path is allocated fixedly in accordance with the network setting described above, there is no need to update the identifier of the communication path of the application 44 restored in the controller 20b.

By establishing the communication path described above, the static operating system 52 transits to the OS initialized state ST2, the initializing task performed by the initializing unit 52a is completed. After completion of the initializing task, the snapshot is extracted, and the application 44 which had run in the controller 20a is restored in the controller 20b (step S20: second step). Specifically, the application restoring unit 53b of the restoring unit 53 included in the controller 20b reflects the snapshot in a memory area of the static operating system 52 so as to restore the state of the application 44. By these tasks, the state of the application 44 which had run in the controller 20a is reflected, and the periodic tasks 44a are restored.

In the sequence of the tasks from when the snapshot is created and saved (step S13: first step) to when the snapshot is extracted and the application 44 is restored (step S20: second step), the static operating system 52 does not need to take over the state of the static operating system 42. It is because the state of the static operating system 42 and the state of the static operating system 52 do not change from the OS initialized state ST2 during the sequence of the tasks.

After restoring the application 44 on the static operating system 52, the periodic tasks 44a of the application 44 restart automatically at the timing of starting the periodic task for next one period. By these tasks, the controller 20a is switched over to the controller 20b while the application 44 is running.

Figure 5:
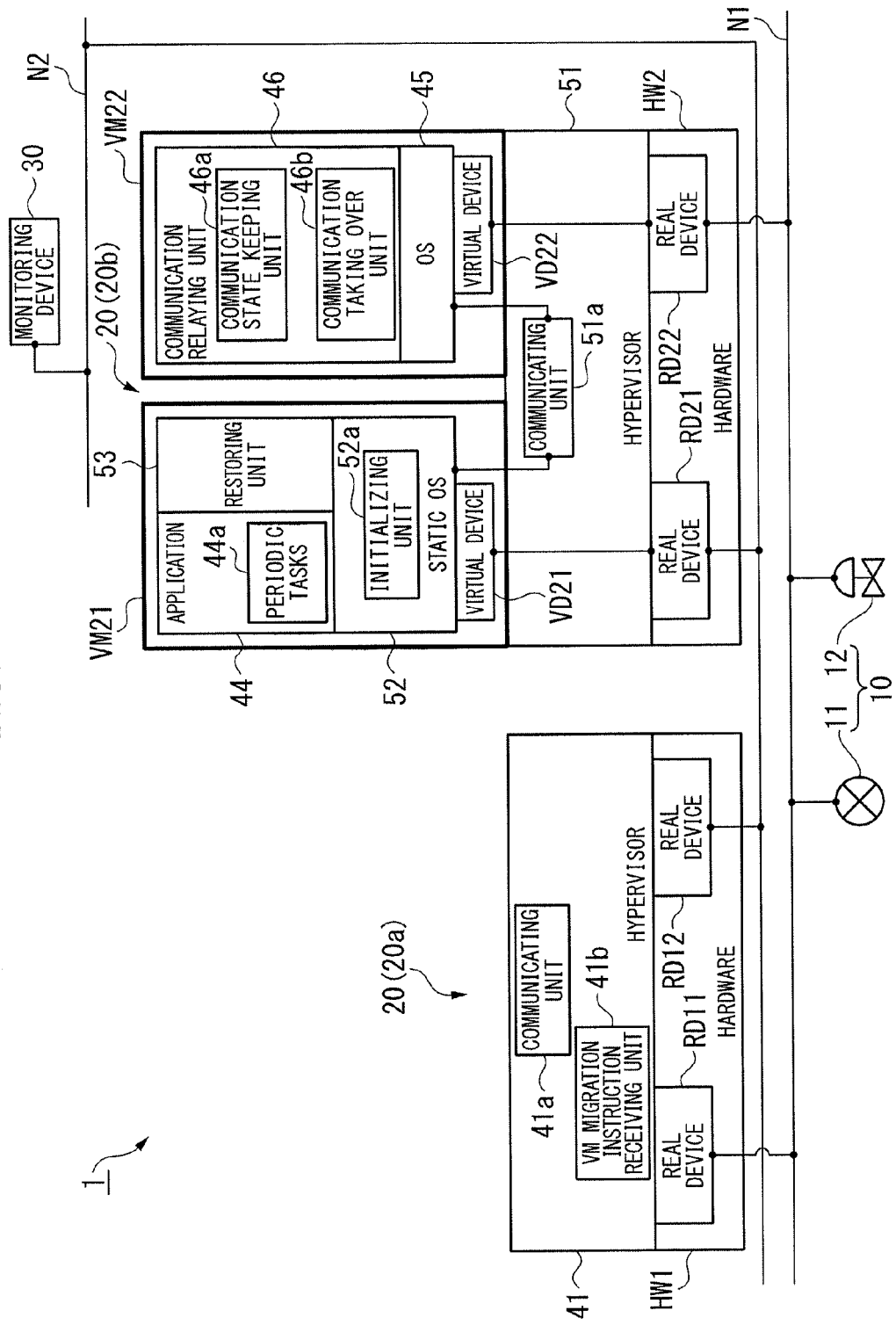
FIG. 5 is a block diagram illustrating the process control system after switching over the controller in the first embodiment.

FIG. 5 is a block diagram illustrating the process control system after switching over the controller in the first embodiment. In FIG. 5, blocks that correspond to those in FIG. 1 are assigned the same reference numerals. As shown in FIG. 5, after completion of switching over the controller, although the hypervisor 41 runs on the hardware HW1 in the controller 20a, no virtual machine runs on the hypervisor 41. It is because the application 44 of the controller 20a is shut down at the step S16 in the FIG. 4, and the communication relaying unit 46 of the controller 20a is shut down at the step S18.

On the other hand, the application 44 runs on the static operating system 52 in the controller 20b, and the virtual machine VM12 which had run in the controller 20a runs as the virtual machine VM22. As described above, the application 44 is restored in the controller 20b so as to continue the operation, and the stateful communication path connected to the monitoring device 30 is not terminated. In the present embodiment, the controller 20 can be switched while continuing running the application 44 and keeping the communication path.

Second Embodiment

[Process Control System]

Figure 6:
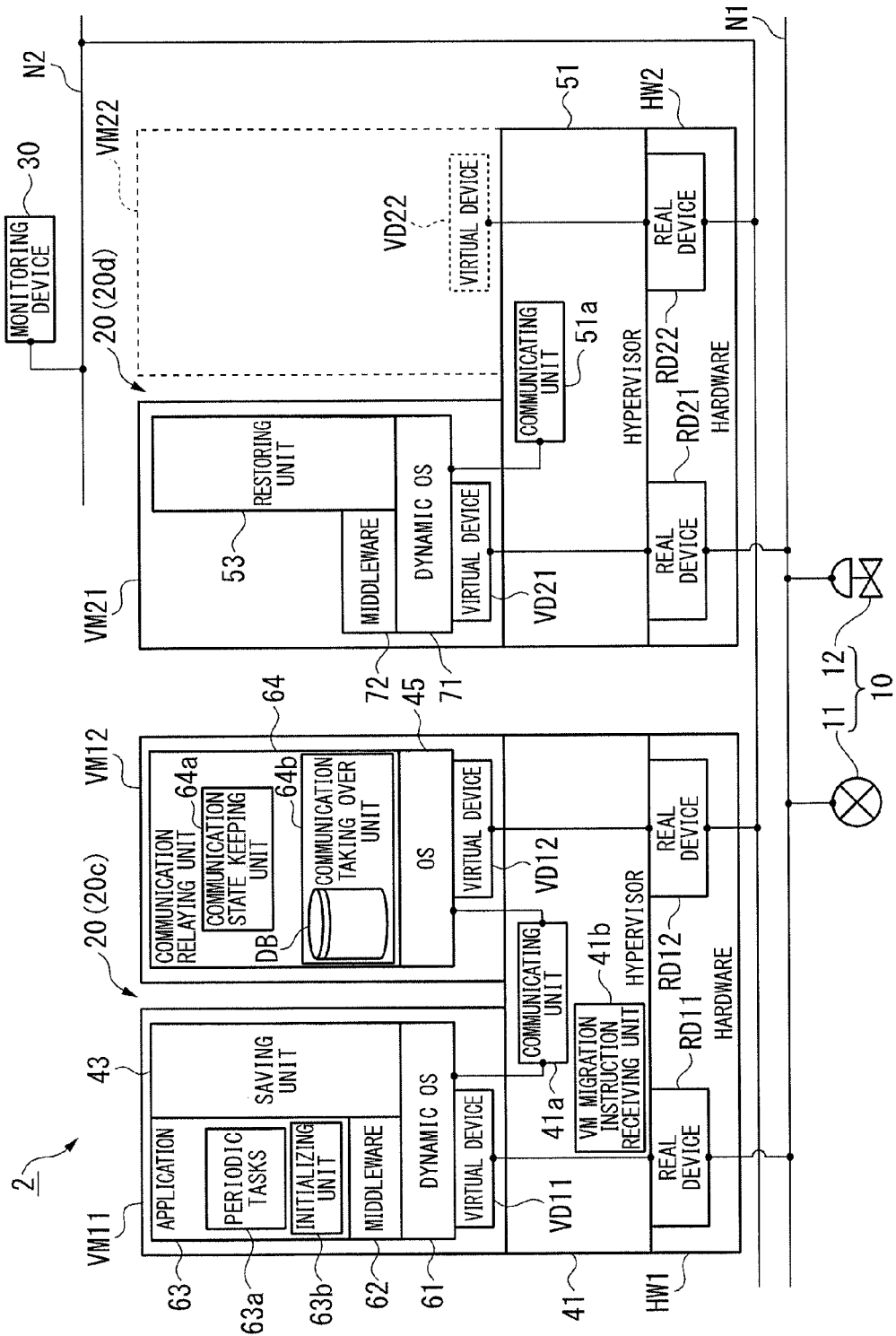
FIG. 6 is a block diagram illustrating a main part of a process control system using a process controller in a second embodiment.

FIG. 6 is a block diagram illustrating a main part of a process control system using a process controller in a second embodiment. In FIG. 6, blocks that correspond to those in FIG. 1 are assigned the same reference numerals. As shown in FIG. 6, the process control system 2 has controllers 20c and 20d using a dynamic operating system instead of the controllers 20a and 20b of the process control system 1 shown in FIG. 1.

The dynamic operating system is an operating system capable of allocating the OS resource objects in each time during executing an application. Because the allocation of the OS resource objects is determined by the application, differing from the static operating system of the first embodiment, the OS resource objects are not preliminarily allocated by using the configurator.

[Controller 20c]

The controller 20c includes a dynamic operating system 61, an application 63 and a communication relaying unit 64 instead of the static operating system 42, the application 44, and the communication relaying unit 46 of the controller 20a shown in FIG. 1. Further, the controller 20c includes a middleware 62. An initializing unit 63b of the application 63 instructs the dynamic operating system 61 running in the virtual machine VM11 to allocate the OS resource objects. Although the dynamic operating system 61 differs from the static operating system 42 in the method of allocating the OS resource objects, the state of the dynamic operating system 61 transits same as the static operating system 42 (refer to FIG. 2).

The middleware 62 is disposed between the dynamic operating system 61 and the application 63, and the middleware 62 establishes the communication path in place of the application 63. In a case that the middleware 62 establishes the communication path, the middleware 62 converts the communication performed by the application 63 and transmits it via the communication relaying unit 64. For example, the middleware 62 is implemented as a wrapper of a socket communication library.

The application 63 runs on the middleware 62 on the dynamic operating system 61. Same as the application 44 shown in FIG. 1, the application 63 controls the field device 10 necessary for controlling the industrial process. The application 63 includes periodic tasks 63a and an initializing unit 63b.

The initializing unit 63b initializes the dynamic operating system 61 by executing an initializing task same as the initializing unit 42a of the static operating system 42 shown in FIG. 1. Because the initializing unit 63b runs on the dynamic operating system 61, the application 63 can create the OS resource objects dynamically and initialize. Also, because the initializing unit 63b is included in the application 63, the initializing unit 63b can use functions of the middleware 62 at a time of initializing.

The periodic tasks 63a perform same as the periodic tasks 44a of the application 44 shown in FIG. 1. However, at the end of the periodic task for one period, there is a need to return the dynamic operating system 61 to a state equal to a state (the OS initialized state ST2) immediately after the initializing task performed by the initializing unit 63b. Specifically, all OS resource objects created during the periodic task are returned to the state immediately after the initializing task.

Same as the communication relaying unit 46 shown in FIG. 1, the communication relaying unit 64 runs on the operating system 45. The communication relaying unit 64 relays the communication between the application 63 and the monitoring device 30 while keeping the state of the stateful communication path between the application 63 and the monitoring device 30. The communication relaying unit 64 includes a communication state keeping unit 64a and a communication taking over unit 64b. The communication state keeping unit 64a is same as the communication state keeping unit 46a included in the communication relaying unit 46 shown in FIG. 1. Also, the communication taking over unit 64b is same as the communication taking over unit 46b included in the communication relaying unit 46 shown in FIG. 1.

However, the communication taking over unit 64b includes a database DB storing information indicating a relation between a first descriptor and a second descriptor. The database DB is created in accordance with the initializing task performed by the initializing unit 63b (described later). The database DB is used for relaying the communication between the application 63 and the monitoring device 30 and re-establishing the communication path. The first descriptor is a descriptor on the application 63, and the first descriptor is a descriptor of the established communication path connected to the application 63. The second descriptor is a descriptor on the communication state keeping unit 64a, and the second descriptor is a descriptor of the established stateful communication path connected to the monitoring device 30. Although information of both ends of the communication path is determined dynamically in the initializing unit 63b, the initializing unit 63b cannot be re-operated (described later). For the reason, external functions of the initializing unit 63b relays and re-establishes the communication by using the first and second descriptors instead of the information of both ends of the communication path. Therefore, the database DB is created.

FIG. 7 is a drawing illustrating an example of the contents of the database in the second embodiment. The database shown in FIG. 7 is for a case that the descriptor of the communication path is a socket descriptor. As shown in FIG. 7, the information indicating the relation between the first descriptor and the second descriptor is saved in the each entry. When the establishment of the communication path is instructed in the initializing task performed by the initializing unit 63b, the communication taking over unit 64b creates an entry of the database DB. For example, in the initializing task, when the initializing unit 63b starts to establish the communication path with the monitoring device 30, the middleware 62 transmits the first descriptor to the application 63, and the middleware 62 transmits the first descriptor to the communication taking over unit 64b. The communication taking over unit 64b instructs the establishment of the communication path for communicating with the monitoring device 30 to the communication state keeping unit 64a, and the communication taking over unit 64b receives the second descriptor. The communication taking over unit 64b relates the first descriptor to the second descriptor, and the communication taking over unit 64b stores the information in the database DB. The application 63 holds the first descriptor in the memory area. At this time, an arbitrary communication path is preliminarily established between the middleware 72 and the communication taking over unit 64b, in which communication data and the information of the first and second descriptors can be communicated by the communicating unit 41a.

[Controller 20d]

The controller 20d has a dynamic operating system 71 instead of the static operating system 52 of the controller 20b shown in FIG. 1. Also, the controller 20d has a middleware 72. The dynamic operating system 71 runs on the virtual machine VM 21. The dynamic operating system 71 creates and allocates the OS resource objects in each time, the OS resource objects are necessary for running the restoring unit 53 and the restored application 63. Although the dynamic operating system 71 differs from the static operating system 52 in the method of allocating the OS resource objects, the state of the dynamic operating system 71 transits same as the static operating system 52 (refer to FIG. 2). When the controller 20d is booted, the dynamic operating system 71 is initialized automatically.

The middleware 72 is disposed between the dynamic operating system 71 and the application 63, and the middleware 72 establishes the communication path in place of the application 63. Same as the middleware 62, in a case that the middleware 72 establishes the communication path, the middleware 72 converts the communication performed by the application 63 and transmits it via the communication relaying unit 64.

[Switching Over Method of the Controller]

The method of switching over the controller 20c to the controller 20d is basically same as the method of switching over the controller 20a to the controller 20b described in the first embodiment. That is, an operation of setting the new controller 20d, an operation of installing the controller 20d in the field, and an operation of connecting the controller 20d to the field network N1 and the control network N2 are performed sequentially. After the controller 20d is powered on, a switching over task of the controller 20 is performed by transmitting the switching over instruction (instruction for switching over the controller 20c to the controller 20d) from an instruction apparatus (not shown) to the controller 20c. Because the task of switching over the controller 20 is performed basically according to the flowchart shown in FIG. 4, a detail explanation is left out.

The middleware 72 and the communication taking over unit 64b migrated to the virtual machine VM22 take over the communication so that the communication can be continued. In a case that the initializing unit 63b runs after restoring the application 63, the state of the restored application 63 is initialized again. For the reason, the communication cannot be taken over by running the initializing unit 63b as described in the first embodiment.

The middleware 72 and the communication taking over unit 64b refer to the entry of the database DB so that the communication can be taken over. The relation between the first descriptor and the second descriptor is described in the entry of the database DB. Therefore, if the middleware 72 relays the communication according to the first descriptor on the application 63 migrated to the virtual machine VM 21, and if the communication taking over unit 64b relays the communication according to the second descriptor on the communication state keeping unit 64a, the communication can be taken over. At this time, an arbitrary communication path is preliminarily re-established between the middleware 72 and the communication taking over unit 64b, in which communication data and the information of the first and second descriptors can be communicated by the communicating unit 51a.

Even if the controller is switched over, the entry of the database DB can be used so as to take over the communication without updating. It is because the second descriptor is held by the communication state keeping unit 64a, the first descriptor is held in the memory area of the application 63, and the first and second descriptors are taken over by the new controller when the controller switched over.

Third Embodiment

Figure 8:
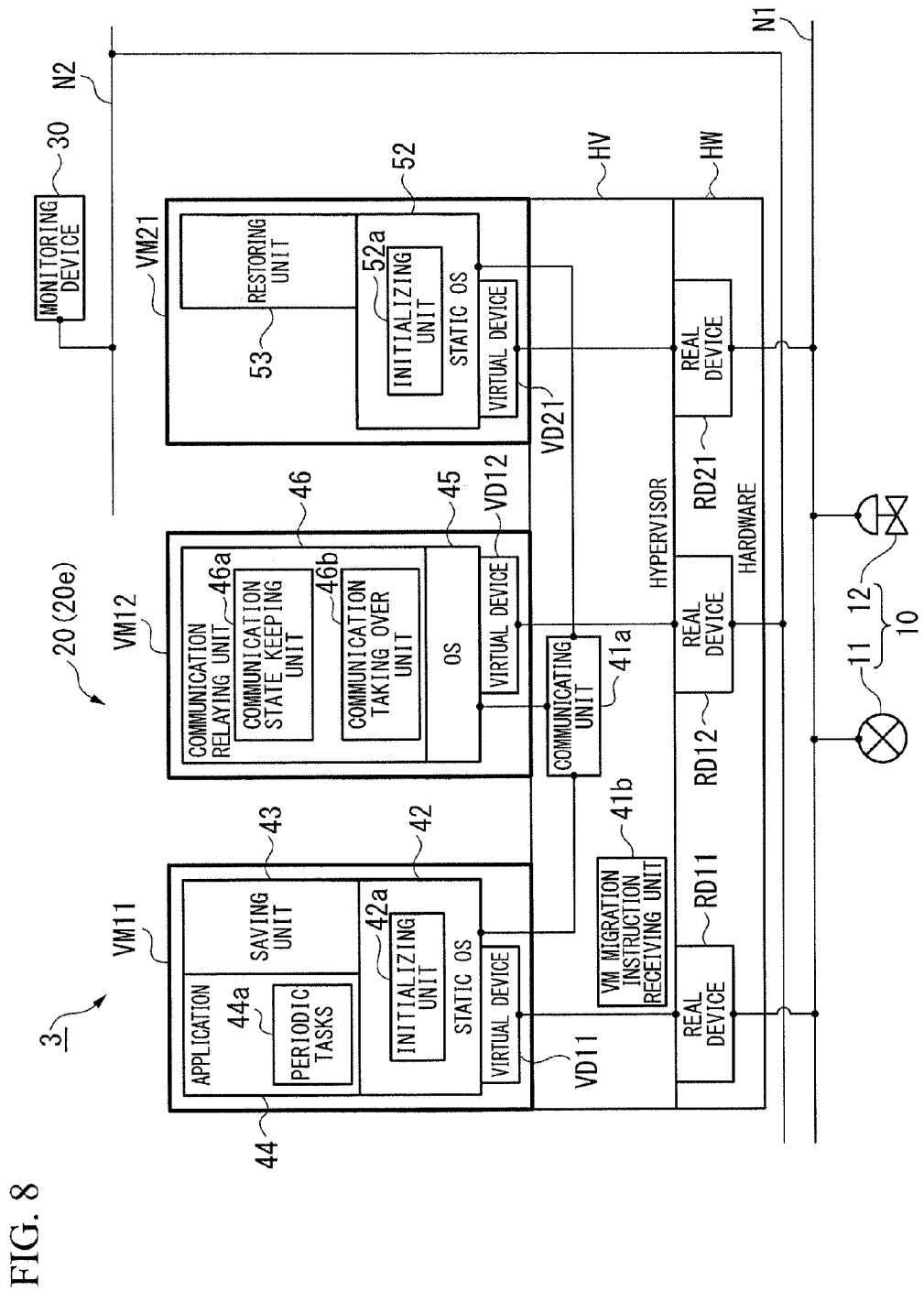
FIG. 8 is a block diagram illustrating a main part of a process control system using a process controller in a third embodiment.

FIG. 8 is a block diagram illustrating a main part of a process control system using a process controller in a third embodiment. In FIG. 8, blocks that correspond to those in FIG. 1 are assigned the same reference numerals. As shown in FIG. 8, the process control system 3 has a controller 20e instead of the controllers 20a and 20b of the process control system 1 shown in FIG. 1.

In the first embodiment described above, the application 44 and the communication relaying unit 46 which had run in the controller 20a are migrated to the other controller 20b. Also, in the second embodiment described above, the application 63 and the communication relaying unit 64 which had run in the controller 20c are migrated to the other controller 20d. On the other hand, in the present embodiment, the application 44 is migrated in the controller 20e.

As shown in FIG. 8, the controller 20e has a hardware HW instead of the hardware HW1 of the controller 20a and the hardware HW2 of the controller 20b which are shown in FIG. 1. Also, the controller 20e has a hypervisor HV instead of the hypervisor 41 of the controller 20a and the hypervisor 51 of the controller 20b which are shown in FIG. 1. In the controller 20e, the virtual machines VM11, VM12 and VM21 run on the hypervisor HV.

In the controller 20e, by these tasks same as the first embodiment, the application 44 running on the static operating system 42 can be restored on the static operating system 52. Because the running of the communication relaying unit 46 is continued before and after restoring the application 44, there is no need to migrate the communication relaying unit 46. In a case of updating the static operating system (for example, version upgrade), the controller 20e is useful. The present embodiment can be adapted to a controller using a dynamic operating system such as the controllers 20c and 20d shown in FIG. 6.

Other Embodiment

By combining the first embodiment with the second embodiment, the initializing unit 42a of the static operating system 42 shown in FIG. 1 may be included in the application 44. In this case, the initializing unit 52a of the static operating system 52 is included in the restored application 44. Therefore, the initializing unit 42a included in the application 44 (the initializing unit 52a included in the restored application 44) can establish the stateful communication path. Further, the application 44 can run with a small memory and in a short time, which is an advantage of the static operating system, and the communication path can be established dynamically.

Although a process control apparatus, a process controller and an updating method thereof according to embodiments of the present invention have been described above, the present invention is not restricted to the above-described embodiments, and can be freely modified within the scope thereof. For example, although the foregoing descriptions of the embodiments have been examples in which a virtual environment that can run a plurality of operating systems or applications is implemented with the hypervisors, the means for implementing such a virtual environment is not restricted to being the hypervisor. For example, the above-noted virtual environment may be implemented with hardware.

Also, in the embodiments, although an example of the field devices 10 performing the digital communicating via the field network N1 have been described above, field devices transmitting and receiving analog signals may be used. In this case, an I/O node converting the signals (analog signals) transmitted or received by the field devices and the signals (digital signals) communicated via the field network N1 is connected to the field network N1. Further, the I/O node and the field device are connected to an analog transmission path (for example, a transmission line used for transmitting signals of "4 [mA] to 20 [mA]."

Also, in the embodiments described above, although the communication of the field network N1 is performed in the stateless communication path, and there is no need to keep the state of the communication, a stateful communication path may be used in the field network N1. In this case, the communication relaying unit 46 keeps the state of the communication in the field network N1.

The term "configured" is used to describe a component, unit or part of a device includes hardware and/or software that is constructed and/or programmed to carry out the desired function.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A first process controller comprising:
   at least one processor and at least one memory;
   a first virtualizer, comprising said at least one processor and a content of said at least one memory, said first virtualizer being configured to run in the first process controller;
   a first operating system configured to run on the first virtualizer, the first operating system transiting from a first state to a second state in a case that a control of an industrial process implemented in a plant is started, the first operating system transiting from the second state to the first state in a case that the control of the industrial process for one period ends, the first state being a state waiting for starting the control of the industrial process, and the second state being a state in which the control of the industrial process is performed;
   a second operating system configured to run on the first virtualizer;
   a communication relaying unit configured to run on the second operating system, the communication relaying unit keeping a communication state of a host device, the communication relaying unit relaying a communication between the application and the host device while continuing the communication between the application and the host device;
   an application stored in said at least one memory and configured to run on the first operating system, the application performing the control of the industrial process at a constant period; and
   a saving unit, comprising said at least one processor and a content of said at least one memory, said saving unit being configured to save information representing an inner state of the application in a case that the first operating system is in the first state, the information being necessary for restoring the application in a second process controller different from the first process controller.

2. The first process controller according to claim 1, wherein the first operating system is a static operating system preliminarily allocating resources necessary for running the application.

3. The first process controller according to claim 1, wherein the first operating system is a dynamic operating system dynamically allocating resources necessary for running the application in accordance with a request of the application.

4. The first process controller according to claim 1, further comprising:
   a middleware disposed between the first operating system and the application, the middleware establishing a communication path in place of the application.

5. The first process controller according to claim 1, further comprising:
   periodic tasks included in the application, the periodic tasks controlling the industrial process.

6. The first process controller according to claim 1, further comprising:
   an initializing unit included in the first operating system, the initializing unit initializing the first operating system before the saving unit and the application run.

7. The first process controller according to claim 1, further comprising:
   a communication state keeping unit included in the communication relaying unit, the communication state keeping unit establishing a communication path with the host device, and the communication state keeping unit keeping the established communication path; and
   a communication taking over unit included in the communication relaying unit, the communication taking over unit establishing a communication path with the application, the communication taking over unit re-establishing the communication path in a case that a platform in which the application runs is switched over.

8. A second process controller connected to the first process controller according to claim 1, the second process controller comprising:
   a second virtualizer configured to run in the second process controller;
   a third operating system configured to run on the second virtualizer, the third operating system transiting from a first state to a second state in a case that the control of an industrial process is started, the third operating system transiting from the second state to the first state in a case that the control of the industrial process for one period ends, the first state being a state waiting for starting the control of the industrial process, and the second state being a state in which the control of the industrial process is performed; and
   a restoring unit configured to receive the information representing the inner state of the application from the saving unit of the first process controller according to claim 1, the restoring unit restoring the application of the first process controller according to claim 1 on the third operating system based on the received information.

9. The second process controller according to claim 8, wherein the second virtualizer migrates a second operating system running on the first virtualizer of the first process controller and the communication relaying unit running on the second operating system of the first process controller while the communication between the application and the host device is taken over.

10. A process controller comprising:
    at least one processor and at least one memory;
    a virtualizer, comprising said at least one processor and a content of said at least one memory, said virtualizer being configured to run in the process controller;
    first and second operating systems configured to run on the virtualizer, the first and second operating systems transiting from a first state to a second state in a case that a control of an industrial process implemented in a plant is started, the first and second operating systems transiting from the second state to the first state in a case that the control of the industrial process for one period ends, the first state being a state waiting for starting the control of the industrial process, and the second state being a state in which the control of the industrial process is performed;

an application stored in said at least one memory and configured to run on the first operating system, the application performing the control of the industrial process at a constant period;

a saving unit, comprising said at least one processor and a content of said at least one memory, said saving unit being configured to save information representing an inner state of the application in a case that the first operating system is in the first state;

a communication relaying unit configured to run on the second operating system, the communication relaying unit keeping a communication state of a host device, the communication relaying unit relaying a communication between the application and the host device while continuing the communication between the application and the host device; and a restoring unit configured to restore the application on the second operating system based on the information saved by the saving unit.

11. The process controller according to claim 10, further comprising:
a third operating system configured to run on the virtualizer; and
a communication relaying unit configured to run on the third operating system, the communication relaying unit keeping a communication state of a host device, the communication relaying unit relaying a communication between the application and the host device while continuing the communication between the application and the host device.

12. The process controller according to claim 11, wherein the virtualizer migrates the third operating system and the communication relaying unit while the communication between the application and the host device is taken over.

13. The process controller according to claim 10, wherein the first operating system is a static operating system preliminarily allocating resources necessary for running the application.

14. The process controller according to claim 10, wherein the first operating system is a dynamic operating system dynamically allocating resources necessary for running the application in accordance with a request of the application.

15. The process controller according to claim 10, further comprising:
periodic tasks included in the application, the periodic tasks controlling the industrial process.

16. The process controller according to claim 10, further comprising:

an initializing unit included in the first operating system, the initializing unit initializing the first operating system before the saving unit and the application run.

17. The process controller according to claim 11, further comprising:
a communication state keeping unit included in the communication relaying unit, the communication state keeping unit establishing a communication path with the host device, and the communication state keeping unit keeping the established communication path; and
a communication taking over unit included in the communication relaying unit, the communication taking over unit establishing a communication path with the application, the communication taking over unit re-establishing the communication path in a case that a platform in which the application runs is switched over.

18. An updating method of a process controller, said process controller having at least one processor and at least one memory, comprising:
saving with said at least one processor into said at least one memory information representing an inner state of an application in a case that a first operating system is in a first state, the first operating system transiting from the first state to a second state in a case that a control of an industrial process implemented in a plant is started, the first operating system transiting from the second state to the first state in a case that the control of the industrial process for one period ends, the first state being a state waiting for starting the control of the industrial process, and the second state being a state in which the control of the industrial process is performed; and
restoring with said at least one processor into said at least one memory the application on a second operating system different from the first operating system based on the saved information,
wherein a communication relaying unit, configured to run on the second operating system, keeps a communication state of a host device, the communication relaying unit relaying a communication between the application and the host device while continuing the communication between the application and the host device.

19. The updating method according to claim 18, further comprising:
migrating a third operating system and a communication relaying unit while a communication between the application and a host device is taken over, the communication relaying unit running on the third operating system, the communication relaying unit keeping a communication state of a host device, the communication relaying unit relaying the communication between the application and the host device while continuing the communication between the application and the host device.

* * * * *